United States Patent Office 3,402,186
Patented Sept. 17, 1968

3,402,186
5β,19-CYCLOANDROSTANES
John S. Tadanier, Chicago, and John Wayne Cole, Deerfield, Ill., assignors to Abbott Laboratories, North Chicago, Ill., a corporation of Illinois
No Drawing. Filed Feb. 24, 1964, Ser. No. 347,055
5 Claims. (Cl. 260—397.4)

ABSTRACT OF THE DISCLOSURE 3,6,17-trisubstituted 5β,19-cycloandrostanes are described which are useful as growth-promoting and growth-regulaing agents with substantially no sex-hormone activities.

---

The present invention is directed to new steroids. In particular, it is concerned with 5β,19-cycloandrostanes and the process for their preparation.

The new 5β,19-cycloandrostanes have the generic formula

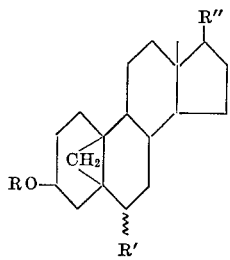

wherein R is hydrogen, HZ, PhZ or HZCO, and wherein R' and R" are oxygen, hydroxy or

with Ph representing phenyl and Z representing an alkylene radical having 1 to 7 carbon atoms. R' may be in the 6α- or 6β-position as indicated by the wavy line in the above formula.

These new compounds exhibit the phenomenon of having substantially no sex-hormone activity but are useful growth-promoting and growth-regulating agents when administered to warm-blooded animals.

According to the present invention, the new compounds are made by a solvolysis process of a sulfonic acid ester of a 19-hydroxy-5-androstene which may carry various inert substituents. In the simplest embodiment, a steroid of the partial structure

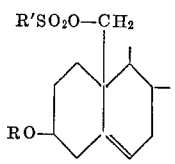

wherein R is HZ or PhZ, and wherein R' is HZ, tolyl or Ph, with Z and Ph having the above defined meanings, is treated with water, or a carboxylic acid, at a temperature between about 40° and 80° C. in the presence of a buffer such as potassium acetate. An inert solvent, such as acetone, may be used. During this reaction, the 5β,19-cyclo-ring is formed and the 6-position of the steroid molucule becomes substituted with hydroxy or acyloxy, depending on the solvolysis reagent used. Simple and known modifications can then be applied to modify the functional substituents in the 3- and 6-positions and the substituents of the D ring.

In a general embodiment of the present invention, a compound of the formula

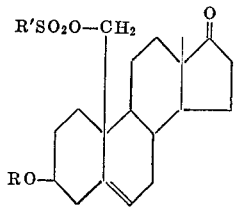

wherein R is hydrogen, HZ or HZCO, and wherein R' is HZ, PhZ or tolyl, is heated to moderate temperatures with a relatively large excess of a compound of the formula a R"OH wherein R" is hydrogen or HZCO. In the case where R" is hydrogen, the corresponding 3,17-substituted-5β,19-cycloandrostan-6-ol is obtained. The 17-oxo group can then be reduced to a hydroxy group and/or the 6-hydroxy group can be oxidized to a keto function or it can be acylated, and/or other known reactions can be carried out to modify these substituents or the function in the 3-position.

To illustrate the procedure of the present invention, reference is made to the following examples which are not meant to limit the invention in any respect. In these examples, where solvent mixtures are followed by proportions, it signifies that solvent mixtures with such ratios are used; where no ratio is indicated after the solvent identification, it means that the first solvent is initially used alone and the solution is then mixed with the second solvent.

Example 1.—3β-methoxy-6α-hydroxy-5β,19-cycloandrostan-17-one

To a cooled solution of 1.66 grams of 3β-methoxy-19-hydroxyandrost-5-en-17-one in 45 ml. of anhydrous pyridine is added 2.0 ml. of methanesulfonyl chloride. The resulting solution is allowed to stand at room temperature for 2.5 hours. The reaction mixture is then poured into 500 ml. of water and the resulting aqueous suspension is extracted with 250 ml. of chloroform. The chloroform solution is washed with 200 ml. of a 5% aqueous sodium bicarbonate solution and three 200-ml. portions of water. The chloroform solution is dried over anhydrous magnesium sulfate and is evaporated under reduced pressure using a rotary evaporator and a water bath temperature of 70° C. The residue is triturated with 25 ml. of pentane and the pentane is separated from the crystalline product by decantation, leaving 1.64 grams of 3β-methoxy-19-methanesulfonoxyandrost-5-en-17-one which melts at 132–133.5° C. with subsequent decomposition.

The above methanesulfonate is refluxed for 16 hours with 1.6 grams of potassium acetate, 30 ml. of water, and 100 ml. of acetone. The major portion of the acetone is then evaporated under reduced pressure and the residue is shaken with 300 ml. of water and 400 ml. of ether. The aqueous phase is separated and extracted with 400 ml. of ether. The ether solutions are washed in series with 200 ml. of 5% sodium bicarbonate solution and three 200-ml. portions of water. The ether solutions are then combined and dried over magnesium sulfate. After evaporation of the ether, 1.35 grams of an oil remains, which is heated under reflux for 1 hour with 100 ml. of 5% potassium hydroxide is methanol. The product is worked up by ether extraction to yield 1.16 grams of a glass which is placed on a column of 100 grams of Woelm neutral activity-III alumina. The column is eluted with 950 ml. of ether/benzene (1:5) followed by 300 ml. of ether/benzene (1:3), yielding 794.4 mg. of a solid which is crystallized from ether/petroleum ether, resulting in 657.5 mg. of 3β-methoxy-6α-hydroxy-5β,19-cycloandrostan-17-one, which melts at 105–106° C., has an $[\alpha]_D^{27}$ of +126° (1% solution in chloroform), and produces analytical results in agreement with the compound of empirical formula $C_{20}H_{30}O_3$.

When, in the above example, methanesulfonyl chloride is replaced by benzenesulfonyl chloride or toluenesulfonyl chloride, similar yields of 3β-methoxy-6α-hydroxy-5β,19-cycloandrostan-17-one are obtained. When, on the other hand, the starting material is the corresponding 3β-benzyloxy compound, 3β-benzyloxy-6α-hydroxy-5β,19-cycloandrostan-17-one is obtained. Upon hydrogenating the latter in the presence of a palladium catalyst, 5β,19-cycloandrostane-3β,6α,17β-triol is obtained.

When in the above example the starting material is replaced by the corresponding 3β-acetoxy compounds, crude 3β-acetoxy-6α-hydroxy-5β,19-cycloandrostan-17-one is obtained which, upon being treated with a 2% alcoholic potassium hydroxide solution, hydrolyzes to 5β,19-cycloandrostan-17-one-3β,6α-diol of formula $C_{19}H_{28}O_3$.

The starting materials used in this example were described by J. Tadanier in the Journal of Organic Chemistry, volume 28, pages 1744–5 of 1963.

Example 2.—3β-methoxy-5β,19-cycloandrostane-6,17-dione

To a solution of 257.5 mg. of 3β-methoxy-6α-hydroxy-5β,19-cycloandrostan-17-one in 2 ml. of pyridine is added a complex prepared from 300 mg. of chromic anhydride and 3 ml. of pyridine. The resulting mixture is allowed to stand overnight at room temperature and the solution is then diluted with 50 ml. of ether and filtered through a celite mat. The ether solution after washing with five 30-ml. portions of water and drying over anhydrous magnesium sulfate, is evaporated, leaving 247.4 mg. of 3β-methoxy-5β,19-cycloandrostane-6,17-dione, melting at 138–139° C. An analytical sample of white needles, recrystallized from benzene/petroleum ether, shows the same melting point and has $[\alpha]_D^{27}$ of +13° (as a 1% chloroform solution) and has a $\lambda_{max}$ of 210 mμ, ε 4,230 ethanol. The analytical values are in good agreement with those calculated from the empirical formula $C_{20}H_{28}O_3$.

When in this example the starting material is replaced with 5β,19-cycloandrostan-17-one-3β,6α-diol, the above procedure produces 5β,19-cycloandrostane-3,6,17-trione of formula $C_{19}H_{24}O_3$. When the starting material is 3β-benzyloxy-6α-hydroxy-5β,19-cycloandrostan-17-one, the corresponding 6,17-dione is obtained which corresponds to the empirical formula $C_{26}H_{32}O_3$.

Example 3.—3β-methoxy-5β,19-cycloandrostane-6α,17β-diol

To a solution of 222 mg. of 3β-methoxy-6α-hydroxy-5β,19-cycloandrostan-17-one in 26 ml. of methanol is added 6 ml. of a solution prepared from 850 mg. of sodium borohydride in 10 ml. of water. During the addition, the solution is stirred, which is continued at room temperature for 15 minutes thereafter. The reaction mixture is poured into 250 ml. of water and the resulting suspension is worked up by ether extraction in the usual manner, to yield 214.7 mg. of 3β-methoxy-5β,19-cycloandrostane-6α,17β-diol, melting at 183–187° C. Recrystallization from acetone/petroleum ether gives the pure product, melting at 190–192° C., $[\alpha]_D^{28}$ +47° (1% solution in chloroform). The analytical values are in good agreement with those calculated for the empirical formula $C_{20}H_{32}O_3$.

By using, as the starting material in the above example, 3β-benzyloxy-5β,19-cycloandrostane-6,17-dione, there is obtained 3β-benzyloxy-5β,19-cycloandrostane-6β,17β-diol corresponding to the formula $C_{26}H_{36}O_3$.

Example 4.—3β-methoxy-5β,19-cycloandrostane-6β,17β-diol

To a stirred solution of 410.6 mg. of 3β-methoxy-5β,19-cycloandrostane-6,17-dione in 50 ml. of methanol at 0° is added 12 ml. of a solution prepared from 1.7 grams of sodium borohydride and 20 ml. of water. After the addition is complete, the reaction flask is removed from the ice bath and stirring is continued at room temperature for 30 minutes. The reaction solution is poured into 500 ml. of water and the resulting mixture is worked up by ether extraction in the usual manner, to yield 409.6 mg. of a crystalline residue. Fractional crystallization of this material from acetone/petroleum ether yields 118.3 mg. of 3β-methoxy-5β,19-cycloandrostane-6α,17β-diol, melting at 189–192° C., identical in all respects to the product described in Example 3 above, and 152.9 mg. of 3β-methoxy-5β,19-cycloandrostane-6β,17β-diol, melting at 135–138° C., $[\alpha]_D^{28}$ +10.7° (1% solution in chloroform). The analysis is in good agreement with the calculated values for the empirical formula $C_{20}H_{32}O_3$.

By using 3β-benzyloxy-5β,19-cycloandrostan-6,17-dione as the starting material in this example, a mixture of 3β-benzyloxy-5β,19-cycloandrostane-6α,17β- and 6β,17β-diols is obtained. These epimers can be separated by fractional crystallizations.

Example 5.—3β-methoxy-6α,17β-diacetoxy-5β,19-cycloandrostane

To a solution of 103 mg. of 3β-methoxy-5β,19-cycloandrostane-6α,17β-diol in 4 ml. of pyridine is added 1.5 ml. of acetic anhydride and the resulting solution is allowed to stand overnight at room temperature. The solution is then poured into 50 ml. of water and the product is worked up by ether extraction in the usual manner to yield 126 mg. of amorphous 3β-methoxy-6α,17β-diacetoxy-5β,19-cycloandrostane. The analytical values are in agreement with those calculated from the empirical formula $C_{24}H_{36}O_5$.

When in this example the starting material is replaced by the corresponding 6β,17β-diol, the corresponding 6β,17β-diacetate is obtained by the same procedure.

When in accordance with the above example 3β-methoxy-6α(or 6β)-hydroxy-5β,19-cycloandrostan-17-one is treated with acetic anhydride, 3β-methoxy-6α(or 6β)-acetoxy-5β,19-cycloandrostan-17-one is obtained. By replacing acetic anhydride with another lower fatty acid anhydride or a corresponding acyl chloride, other acylated 6α (or 6β)-analogs of the above compound can be obtained by (essentially) the same procedure. This acylation procedure can also be used for hydroxy groups in the 3- or the 17-positions to introduce longer fatty acid chains, if desired. One or more of the acyloxy groups so formed may be hydrolyzed by one of the customary procedures for hydrolyzing esters with alkali, and thus replaced by a hydroxy group in that same position.

It will be understood by those skilled in the art that inert substituents such as alkyl or acyloxy groups on rings C or D will not interfere with the reactions illustrated in the above examples. It will also be apparent that when instead of methoxy, the starting material used in the above examples carries in the 3-position a hexyloxy, isopropoxy or similar loweralkyloxy group, the analogous series of compounds can be prepared in the manner described. Throughout the present description, the term "loweralkyl" is to be understood as including saturated, branched or straight hydrocarbon chains of 1–7 carbon atoms.

Others may practice the invention in any of the numerous ways which will be obvious to those skilled in the art by the present disclosure. All such practice of the invention is considered a part hereof provided it falls within the scope of the appended claims.

We claim:
1. A steroid of the formula

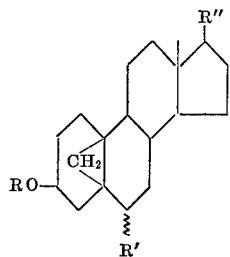

wherein R is selected from the group consisting of HZ and $C_6H_5Z$, wherein R' is selected from the group consisting of hydroxy, and oxygen, and wherein R" is selected from the group consisting of hydroxy and HZCOO, with Z representing a saturated alkylene radical of 1-7 carbon atoms.

2. 3β-methoxy-5β,19-cycloandrostane-6,17-dione.
3. 3β-benzyloxy-5β,19-cycloandrostane-6,17-dione.
4. 3β-methoxy-5β,19-cycloandrostane-6,17β-diol.
5. 3β-methoxy-6,17β-diacetoxy-5β,19-cycloandrostane.

References Cited

UNITED STATES PATENTS 3,184,484  5/1965  Knox _____ 260—397.3

H. A. FRENCH, *Primary Examiner.*